(No Model.)

G. W. GOODING.
TANK FOR OIL WAGONS.

No. 598,599. Patented Feb. 8, 1898.

WITNESSES
Harry L. Amer.

INVENTOR
George W. Gooding.
By John Shedderman
Attorney

UNITED STATES PATENT OFFICE.

GEORGE W. GOODING, OF SEATTLE, WASHINGTON.

TANK FOR OIL-WAGONS.

SPECIFICATION forming part of Letters Patent No. 598,599, dated February 8, 1898.

Application filed February 19, 1897. Serial No. 624,191. (No model.)

*To all whom it may concern:*

Be it known that I, GEORGE W. GOODING, a citizen of the United States, residing at Seattle, in the county of King and State of Washington, have invented certain new and useful Improvements in Tanks for Oil-Wagons; and I do hereby declare the following to be a full, clear, and exact description of the invention, such as will enable others skilled in the art to which it appertains to make and use the same.

The invention relates to improvements in tanks, and has more particular relation to wagon-tanks intended for the distribution of oil.

The invention consists of certain novel constructions, combinations, and arrangements of parts, all of which will be hereinafter more particularly set forth and claimed.

Figure 1:
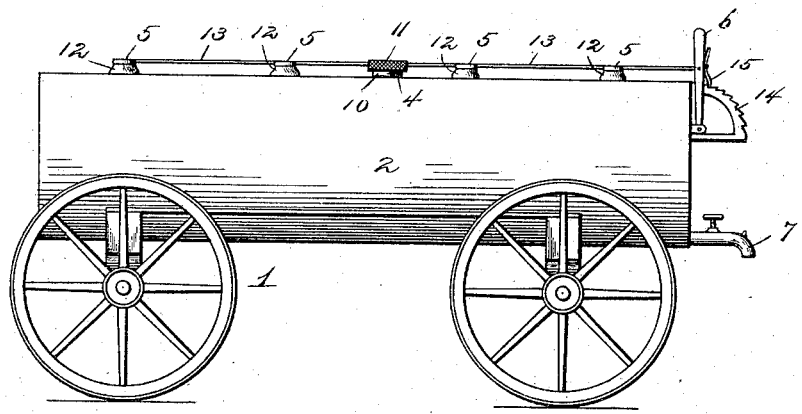
Figure 2:
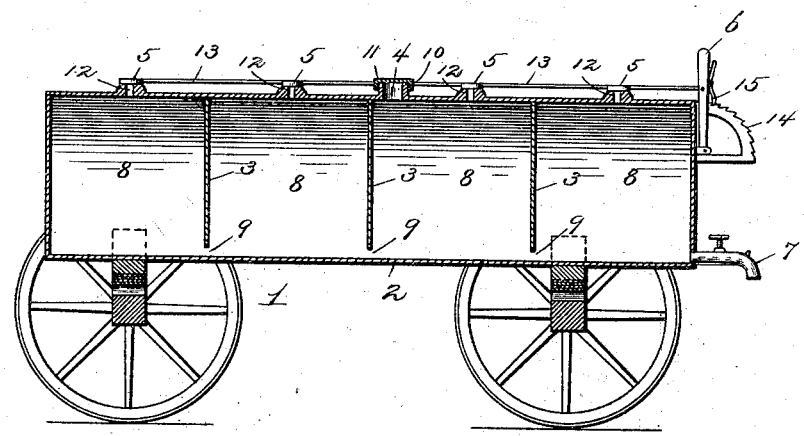
Figure 3:
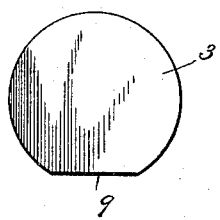
Figure 4:
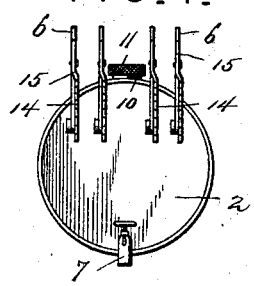

In the accompanying drawings, forming part of this specification, Figure 1 represents a side elevation of a tank-wagon constructed according to my invention. Fig. 2 represents a central vertical section through the same. Fig. 3 represents an enlarged detail side elevation of one of the vertical partitions, and Fig. 4 an elevation of the tank.

1 in the drawings represents the wagon-truck; 2, the tank proper; 3 3, the vertical partitions; 4, the filling-inlet; 5 5, the air-valves; 6 6, the operating-levers, and 7 the delivery-spout.

The tank proper, 2, which is preferably cylindrical in form, is secured on the truck 1 in any desirable manner and is provided with any ordinary construction of delivery-spouts 7. The tank is also provided with a plurality of compartments 8 8, having communication with each only at their lower ends. This communication is established by cutting away the lower portions of the partitions, as at 9. The tank 2 is also provided with a screw-threaded flange 10, upon which a screw-cap 11 is adapted to screw to close the filling-aperture. The said tank 2 is further provided with a plurality of air-vents 12, one for each compartment 8 and located at the top of the same. Each of these vents is closed by a valve 5, said valves being connected, respectively, to operating-rods 13, which extend rearwardly along the upper surface of the tank 2, and are connected, respectively, to the operating-levers 6 6, pivotally mounted upon the rear of the tank. Each lever 6 is adapted to work over a segmental rack 14, secured to the back of the tank, and is provided with a spring-pressed pawl 15, adapted to engage said rack, so that said lever may be held at any desired adjusted position.

When the tank 2 is to be filled, all of the air-vents are opened by operating their respective levers and the liquid poured in through the inlet 4, passing from one compartment to another under the partitions 3. After the tank has been filled the cap 11 is applied in position, which prevents the entrance of air into the tank. The valves are also closed by operating the levers 6.

If it is desired to draw oil from the tank, the faucet or spout 7 is opened and the lever of the first compartment 8 operated, which action permits the air to enter into the first of said compartment through the vent and the oil to flow therefrom. The oil in the remaining compartments is held stationary until the first compartment is completely emptied, because of there being no open inlet to said compartments, and the tendency toward a flow would be instantly checked by the vacuum created by such an action.

It will be observed by the foregoing description that all of the compartments 8 remain completely filled except the one from which the oil is being drawn, and thus the oil is prevented from splashing about when the vehicle is in motion. The oil within the filled compartments is prevented from moving in any direction, and simply acts as a solid mass without any gravitation or movement independently of that of the tank itself.

I do not wish to limit my application to oil-tanks, as the same may be applied to any class of portable tanks from which a liquid is to be distributed.

Having thus described my invention, what I claim as new, and desire to secure by Letters Patent, is—

The combination with a tank proper of a plurality of vertical partitions mounted therein and terminating a short distance above the bottom of the same, a discharge for said tank, valved air-inlets for each of the compartments formed in said tanks, rods connected to the said valves, pivoted levers for operating the rods, devices for holding said levers in their
5 adjusted positions, and means for introducing oil into the tank, substantially as described.

In testimony whereof I have signed this specification in the presence of two subscribing witnesses.

GEORGE W. GOODING.

Witnesses:
EDMUND BOWDEN,
D. M. THOMPSON.